United States Patent
Fujishima

(10) Patent No.: US 11,894,522 B2
(45) Date of Patent: Feb. 6, 2024

(54) INSPECTION METHOD OF LAMINATED POWER STORAGE DEVICE

(71) Applicant: Prime Planet Energy & Solutions, Inc., Tokyo (JP)

(72) Inventor: Seigo Fujishima, Miyoshi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 129 days.

(21) Appl. No.: 17/505,740

(22) Filed: Oct. 20, 2021

(65) Prior Publication Data

US 2022/0123355 A1 Apr. 21, 2022

(30) Foreign Application Priority Data

Oct. 21, 2020 (JP) ................. 2020-176523

(51) Int. Cl.
| | |
|---|---|
| *H01M 10/058* | (2010.01) |
| *G01M 3/20* | (2006.01) |
| *G01M 3/32* | (2006.01) |
| *H01M 10/0565* | (2010.01) |

(52) U.S. Cl.
CPC ........... *H01M 10/058* (2013.01); *G01M 3/20* (2013.01); *G01M 3/32* (2013.01); *H01M 10/0565* (2013.01); *Y10T 29/49004* (2015.01)

(58) Field of Classification Search
CPC . Y02E 60/10; H01M 10/0585; H01M 10/058; H01M 50/186; H01M 10/04; H01M 50/172; H01M 4/04; H01M 4/139; Y10T 29/49004
USPC ...................... 29/593, 623.1, 623.2, 863, 763
See application file for complete search history.

(56) References Cited

U.S. PATENT DOCUMENTS

| | | | |
|---|---|---|---|
| 9,470,602 B2 * | 10/2016 | Yasooka | G01M 3/363 |
| 2013/0084484 A1 | 4/2013 | Shinyashiki et al. | |
| 2013/0141571 A1 | 6/2013 | Yasooka et al. | |

FOREIGN PATENT DOCUMENTS

| | | |
|---|---|---|
| CN | 101122360 A | 2/2008 |
| CN | 103674451 A | 3/2014 |
| JP | 2001052748 A | 2/2001 |
| JP | 2001-264209 A | 9/2001 |
| JP | 2003151642 A | 5/2003 |
| JP | 200493208 A | 3/2004 |
| JP | 2010250954 A | 11/2010 |
| JP | 201377447 A | 4/2013 |
| JP | 2014137136 A | 7/2014 |

(Continued)

*Primary Examiner* — Thiem D Phan
(74) *Attorney, Agent, or Firm* — HAUPTMAN HAM, LLP

(57) ABSTRACT

A manufacturing method of a laminated power storage device disclosed herein includes a step A of preparing an electrode body to which an electrode terminal is connected, a step B of preparing a laminated film, a step C of building a power storage device assembly in which the electrode body is covered with the laminated film and is sealed, and a step D of placing the power storage device assembly in a predetermined reduced-pressure atmosphere. The power storage device assembly has a welding portion in which the laminated films are stacked and welded together in a state in which part of the electrode terminal is protruded to the outside from between the laminated films around the electrode body. A pressure of the reduced-pressure atmosphere in the step D is set so as to guarantee that a weld strength of the welding portion is not less than a predetermined strength.

5 Claims, 4 Drawing Sheets

(56) References Cited

FOREIGN PATENT DOCUMENTS

| | | | |
|---|---|---|---|
| JP | 2015176658 | A | 10/2015 |
| JP | 2017117696 | A | 6/2017 |

* cited by examiner

US 11,894,522 B2

INSPECTION METHOD OF LAMINATED POWER STORAGE DEVICE

BACKGROUND OF THE INVENTION

1. Field of the Invention

The present disclosure relates to a manufacturing method of a laminated power storage device and an inspection method of a laminated power storage device. The present application claims priority based on Japanese Patent Application No. 2020-176523 filed on Oct. 21, 2020, the entire contents of which are incorporated herein by reference in its entirety.

2. Description of the Related Art

Japanese Patent Application Publication No. 2001-264209 discloses a method of a leak test which uses tracer gas. According to the method disclosed herein, it is possible to perform the test efficiently irrespective of the size of a workpiece to be inspected by disposing a sealed structure in a vacuum chamber in which the workpiece to be inspected is disposed.

SUMMARY OF THE INVENTION

It is possible to determine whether or not the strength of a portion in a laminated power storage device in which outer casings constituted by laminated films are stacked and welded together (hereinafter referred to as a welding portion) is sufficient by, e.g., a method in which a weld strength is guaranteed by performing destructive inspection such as a peel test in a prototype stage of a product and calculating process capability. In addition, it is possible to determine whether or not a failure mode is caused in a manufacturing stage by performing, e.g., a sampling inspection periodically. However, a technique for inspecting the weld strength nondestructively is not established adequately.

The present inventors wish to propose a method of guaranteeing the strength of the welding portion of the laminated power storage device.

A manufacturing method of a laminated power storage device disclosed herein includes a step A of preparing an electrode body to which an electrode terminal is connected, a step B of preparing a laminated film, a step C of building a power storage device assembly in which the electrode body is covered with the laminated film and is sealed, and a step D of placing the power storage device assembly in a predetermined reduced-pressure atmosphere. The power storage device assembly has a welding portion in which the laminated films are stacked and welded together in a state in which part of the electrode terminal is protruded to the outside from between the laminated films around the electrode body. A pressure of the reduced-pressure atmosphere in the step D is set so as to guarantee that a weld strength of the welding portion is not less than a predetermined strength.

In this manufacturing method, the power storage device assembly is built by sealing the laminated films by welding, and the power storage device assembly is then placed in the reduced-pressure atmosphere. By placing the power storage device assembly in the predetermined reduced-pressure atmosphere, air accommodated inside the laminated films expands. With the expansion, a load is applied in a direction which tears a portion in which the laminated films are welded together. When the weld strength is low, flaking occurs in the portion in which the laminated films are welded together. By incorporating such steps, the power storage device assembly in which the weld strength of the welding portion is insufficient is removed from the manufacturing steps, and it is possible to manufacture the laminated power storage device in which it is guaranteed that the weld strength of the welding portion is not less than a given strength.

The electrode terminal may be plate-shaped. The reduced-pressure atmosphere may be an atmosphere having a pressure which is set for guaranteeing that a weld strength of a portion of the welding portion in which the part of the electrode terminal is protruded to the outside from between the laminated films is not less than a predetermined strength.

Sealing of the laminated film may be performed in a predetermined first reduced-pressure atmosphere of which a pressure is reduced to be lower than atmospheric pressure in the step C. The reduced-pressure atmosphere may be a predetermined second reduced-pressure atmosphere of which a pressure is further reduced to be lower than the pressure of the first reduced-pressure atmosphere in the step D. The electrode body may be covered with the laminated film in the first reduced-pressure atmosphere in the step C.

As another aspect of the technique disclosed herein, an inspection method of a laminated power storage device is provided. The inspection method of a laminated power storage device includes the steps of preparing a laminated power storage device, and placing the laminated power storage device in a predetermined reduced-pressure atmosphere. The laminated power storage device includes an electrode body to which an electrode terminal is connected and an outer casing constituted by a laminated film. The laminated power storage device has a welding portion in which the laminated films are stacked and welded together in a state in which part of the electrode terminal is protruded to the outside from between the laminated films around the electrode body. A pressure of the reduced-pressure atmosphere is set so as to guarantee that a weld strength of the welding portion is not less than a predetermined strength.

The electrode terminal may be plate-shaped. The reduced-pressure atmosphere may be an atmosphere having a pressure which is set for guaranteeing that a weld strength of a portion of the welding portion in which the part of the electrode terminal is protruded to the outside from between the laminated films is not less than a predetermined strength.

DESCRIPTION OF THE PREFERRED EMBODIMENTS

Figure 1:
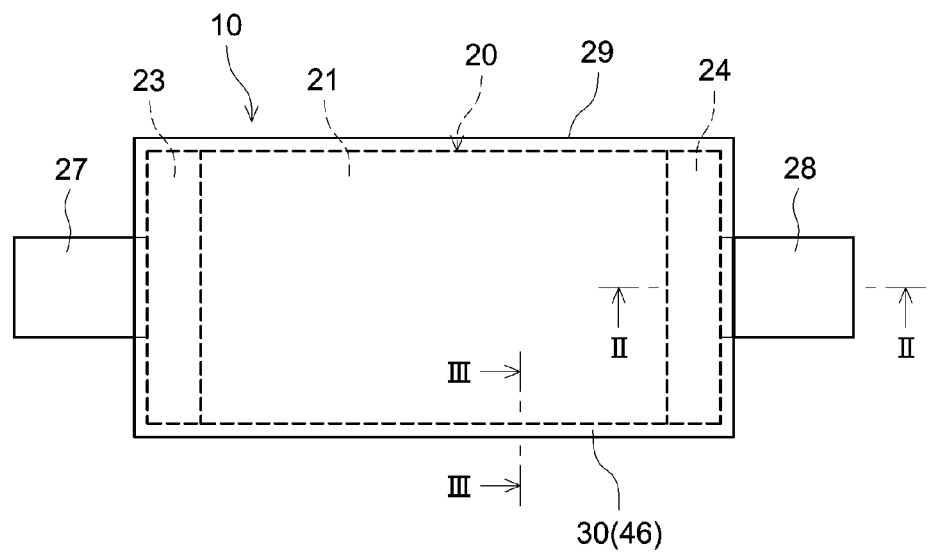
FIG. 1 is a plan view schematically showing a structure of a laminated power storage device according to an embodiment.

Hereinbelow, a description will be given of an embodiment of a manufacturing method of a laminated power storage device proposed herein. Note that, in the drawings described below, there are cases where members and portions which have the same functions are designated by the same reference numerals, and a duplicate description thereof is omitted or simplified. In addition, the dimensional relationship (length, width, thickness, and the like) in the individual drawings may not necessarily reflect the actual dimensional relationship.

A laminated power storage device in the present specification denotes a power storage device in which a laminated film is used in an outer casing. A "power storage device" denotes a device capable of performing charge and discharge. A "power storage device assembly" denotes a structure in which all components of a power storage device are mechanically assembled appropriately and which is not yet subjected to electrochemical activation processing such as initial charge processing. The power storage device includes a lithium polymer battery and a lithium ion capacitor in addition to batteries which are typically referred to as a lithium ion battery and a lithium secondary battery. The secondary battery denotes batteries which can be repeatedly charged and discharged by movement of charge carriers between positive and negative electrodes. The secondary battery may be a battery in which a liquid electrolyte is used, and may also be a so-called all-solid battery which uses a solid electrolyte. In the present specification, pressure denotes absolute pressure unless otherwise specified. In the present specification, in the case where a numerical range is described as A to B (herein, each of A and B is any numerical value), the numerical range means not less than A and not more than B.

Figure 2:
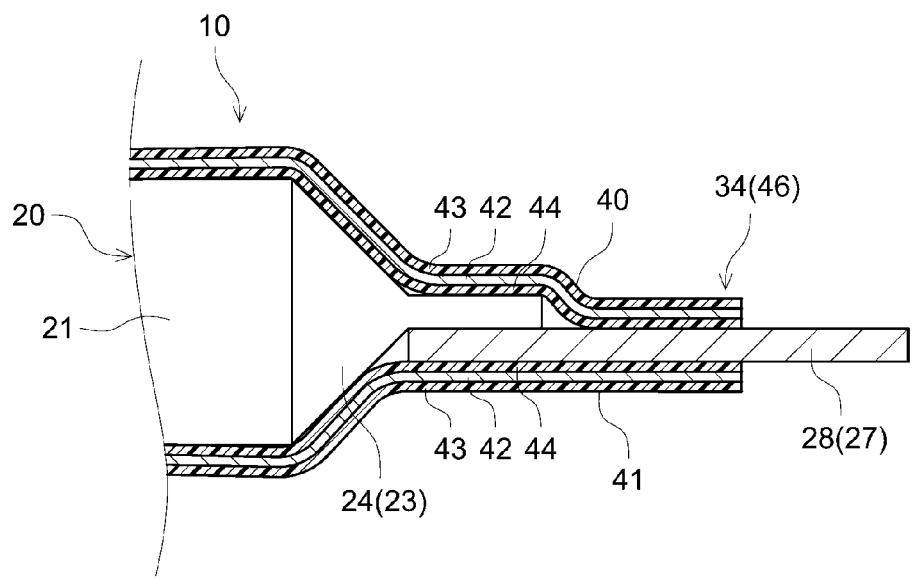
FIG. 2 is a cross-sectional view schematically showing part of the laminated power storage device according to the embodiment.
Figure 3:
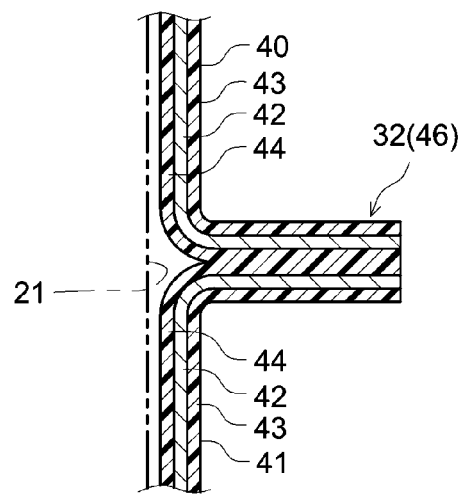
FIG. 3 is a cross-sectional view schematically showing part of the laminated power storage device according to the embodiment.

FIG. 1 is a plan view schematically showing an example of a laminated power storage device 10 manufactured by a manufacturing method disclosed herein. FIG. 2 is a schematic view schematically showing a cross section taken along the line II-II of FIG. 1. FIG. 2 shows a cross section of a portion of the laminated power storage device 10 to which a negative electrode terminal 28 is connected. FIG. 3 is a schematic view schematically showing a cross section taken along the line of FIG. 1. FIG. 3 shows a cross section of a portion of the laminated power storage device 10 to which a positive electrode terminal 27 and the negative electrode terminal 28 are not connected.

As shown in FIG. 1, the laminated power storage device 10 includes an electrode body 20 to which the positive electrode terminal 27 and the negative electrode terminal 28 are connected, and an outer casing 29 made of a laminated film. The electrode body 20 is accommodated in the outer casing 29 in a state in which the positive electrode terminal 27 and the negative electrode terminal 28 are protruded to the outside of the outer casing 29. Note that, in the present embodiment, the laminated power storage device 10 is an all-solid battery.

As shown in FIG. 1, to the electrode body 20, the positive electrode terminal 27 and the negative electrode terminal 28 are connected. The electrode body 20 includes an electrode multilayer portion 21, a positive electrode current collector portion 23, and a negative electrode current collector portion 24. The electrode body 20 is structured so as to serve as a power generation element of the laminated power storage device 10. The electrode body 20 has a multilayer structure in which positive electrode sheets and negative electrode sheets are alternately stacked via solid electrolyte layers. The electrode multilayer portion 21 includes a wide rectangular flat surface in a stacking direction of the positive electrode sheet and the negative electrode sheet.

Though not shown in the drawing, the positive electrode sheet includes a positive electrode current collector foil and a positive electrode active material layer. As the positive electrode current collector foil, it is possible to use metal foil of, e.g., stainless steel (SUS), Ni, Cr, Au, Pt, Al, Fe, Ti, or Zn. As the positive electrode current collector foil, proper metal foil may be used in consideration of conductivity and oxidation resistance. The positive electrode current collector foil has a rectangular shape corresponding to the shape of the flat surface of the electrode multilayer portion 21 described above. At one end of the rectangular shape of the positive electrode current collector foil, a non-formation portion in which the positive electrode active material layer is not formed is provided. The positive electrode active material layer is a layer containing a positive electrode active material. The positive electrode active material layers are formed on both surfaces of the positive electrode current collector foil except the non-formation portion. As the positive electrode active material contained in the positive electrode active material layer, it is possible to appropriately use known positive electrode active materials represented by, e.g., lithium nickel manganese cobalt composite oxides. The positive electrode active material layer may contain a solid electrolyte, a binder, and a conductive material.

Though not shown in the drawing, the negative electrode sheet includes a negative electrode current collector foil and a negative electrode active material layer. As the negative electrode current collector foil, it is possible to use metal foil of, e.g., SUS, Cu, Ni, Fe, Ti, Co, or Zn. The negative electrode current collector foil has a rectangular shape corresponding to the shape of the flat surface of the electrode multilayer portion 21 described above. At one end of the rectangular shape of the negative electrode current collector foil, a non-formation portion in which the negative electrode active material layer is not formed is provided. The negative electrode active material layer is a layer containing a negative electrode active material. The negative electrode active material layers are formed on both surfaces of the negative electrode current collector foil except the non-formation portion. As the negative electrode active material, it is possible to appropriately use known negative electrode active materials represented by, e.g., carbon-based negative electrode active materials such as graphite, hard carbon, and soft carbon, and Si-based negative electrode active materials such as Si and silicon oxide. The negative electrode active material layer may contain a solid electrolyte, a binder, and a conductive material.

The solid electrolyte layer is a layer containing an Li-ion conductor, and insulates the positive electrode active material layer from the negative electrode active material layer. The solid electrolyte layer contains a solid electrolyte. As the solid electrolyte, it is possible to suitably use a sulfide-based solid electrolyte, and a specific example thereof includes a mixture of $Li_2S$ and $P_2S_5$ (a mixing mass ratio of $Li_2S:P_2S_5=50:50$ to 0, and especially preferably $Li_2S:P_2S_5=70:30$). The solid electrolyte layer preferably contains a binder. As the binder, butadiene rubber (BR) is suitable.

In the electrode multilayer portion 21, the positive electrode active material layers and the negative electrode active material layers are alternately stacked via the solid electrolyte layers. The orientations of the non-formation portions of the positive electrode current collector foils constituting the positive electrode current collector portion 23 are adjusted and made uniform, and the non-formation portions thereof are protruded from the electrode multilayer portion 21. The orientations of the non-formation portions of the negative electrode current collector foils constituting the negative electrode current collector portion 24 are adjusted and made uniform, and the non-formation portions thereof are protruded from the electrode multilayer portion 21 on a side opposite to the positive electrode current collector portion 23 of the positive electrode sheet. The positive electrode current collector portion 23 is a portion in which the non-formation portions of the positive electrode current collector foils constituting the positive electrode current collector portion 23 are stacked and brought together. The negative electrode current collector portion 24 is a portion in which the non-formation portions of the negative electrode current collector foils constituting the negative electrode current collector portion 24 are stacked and brought together. The shape of the electrode multilayer portion 21 in which the positive electrode active material layers and the negative electrode active material layers are stacked is substantially rectangular. The positive electrode current collector portion 23 is protruded from one of short sides of the electrode multilayer portion 21. The negative electrode current collector portion 24 is protruded from the short side on a side opposite to the side of the protrusion of the positive electrode current collector portion 23.

As shown in FIG. 2, the negative electrode terminal 28 is electrically connected to the negative electrode current collector portion 24. The negative electrode terminal 28 is a plate-shaped member having a rectangular shape. One of surfaces of the negative electrode terminal 28 is joined to the negative electrode current collector portion 24 by a method such as welding. The negative electrode terminal 28 is formed of, e.g., the same metal as that of the negative electrode current collector foil. The positive electrode terminal 27 is electrically connected to the positive electrode current collector portion 23. The positive electrode terminal 27 is a plate-shaped member having a rectangular shape. One of surfaces of the positive electrode terminal 27 is joined to the positive electrode current collector portion 23 by a method such as welding. The positive electrode terminal 27 is formed of, e.g., the same metal as that of the positive electrode current collector foil.

The outer casing 29 is constituted by two rectangular laminated films 40 and 41 which are slightly larger than the electrode multilayer portion 21. As shown in FIG. 2 and FIG. 3, the outer casing 29 constituted by the laminated films 40 and 41 has a metal sheet 42 for preventing penetration of water or the like, an insulating resin layer 43 which covers an outer surface of the metal sheet, and a thermoplastic resin layer 44 which covers an inner surface of the metal sheet.

Herein, the metal sheet 42 plays a role in providing gas barrier properties for preventing entry of oxygen, water, and an electrolyte solution in the laminated films 40 and 41. The metal sheet 42 can be a metal thin film made of aluminum foil, copper foil, nickel foil, stainless steel foil, clad foil thereof, annealed foil thereof, or unannealed foil thereof. In addition, the metal sheet 42 may also be metal foil plated with conductive metal such as nickel, tin, copper, or chromium. Further, in the metal sheet 42, a chemical conversion coating may be formed as surface treatment. The chemical conversion coating is a coating formed by performing chemical conversion on the surface of the metal sheet 42. Examples of the chemical conversion include chromate treatment and non-chromium chemical conversion which uses a zirconium compound.

The insulating resin layer 43 is a layer on an outer side of each of the laminated films 40 and 41. The insulating resin layer 43 has insulating properties, and has the melting point which does not allow melting of the insulating resin layer 43 when the thermoplastic resin layer 44 is melt and bonded. An example of a resin used in the insulating resin layer 43 includes a resin having the melting point which is sufficiently higher than that of a resin used in the thermoplastic resin layer 44 such as, e.g., polyamide or polyester. As the insulating resin layer 43, oriented films of the above resins can be used. Among them, from the viewpoint of moldability and strength, it is possible to use a biaxially oriented polyamide film, a biaxially orientated polyester film, or a multilayer film including the above films. Further, a multilayer film obtained by laminating the biaxially oriented polyamide film and the biaxially oriented polyester film may also be used. The polyamide film is not particularly limited, and examples thereof include a 6-nylon film, a 6, 6-nylon film, and an MXD nylon film. Examples of the biaxially oriented polyester film include a biaxially oriented polybutylene terephthalate (PBT) film and a biaxially orientated polyethylene terephthalate (PET) film.

The thermoplastic resin layer 44 is a layer on an inner side of each of the laminated films 40 and 41. The thermoplastic resin layer 44 preferably has excellent chemical resistance to corrosivity which is required in a power storage device such as a lithium ion secondary battery. The thermoplastic resin layer 44 is heat-welded when inner surfaces of the laminated films 40 and 41 are stacked and bonded together, and has heat-sealing properties.

From the viewpoint of chemical resistance and heat-sealing properties, the thermoplastic resin layer 44 is preferably constituted by polyethylene, polypropylene, an olefin-based copolymer, an acid modified product thereof, and an ionomer thereof. Examples of the olefine-based copolymer include an ethylene-vinyl acetate copolymer (EVA), an ethylene-acrylic acid copolymer (EAA), and an ethylene-methacrylic acid copolymer (EMAA). In addition, it is also possible to use a polyamide film (e.g., 12 nylon) and a polyimide film. The thermoplastic resin layer 44 may be, e.g., a thermoplastic resin non-oriented film. The thermoplastic resin non-oriented film is not particularly limited, and is preferably constituted by polyethylene, polypropylene, an olefin-based copolymer, an acid modified product thereof, and an ionomer thereof from the viewpoint of chemical resistance and heat-sealing properties. Examples of the olefin-based copolymer include an ethylene-vinyl acetate copolymer (EVA), an ethylene-acrylic acid copolymer (EAA), and an ethylene-methacrylic acid copolymer (EMAA). In addition, it is also possible to use a polyamide film (e.g., 12 nylon) and a polyimide film. Into the thermoplastic resin layer 44, a lubricant and/or a solid particle may be blended in order to increase surface slidability.

The outer casing 29 is disposed so as to face a wide surface of the electrode multilayer portion 21. As shown in FIG. 1, the outer casing 29 covers the electrode body 20 in a state in which the positive electrode terminal 27 and the negative electrode terminal 28 are partially protruded. The outer casing 29 is provided with a depression corresponding to the dimensions of the electrode body 20 such that the electrode body 20 is easily accommodated inside the outer casing 29.

As shown in FIG. 3, the outer casing 29 constituted by the two laminated films 40 and 41 is sealed by heat-welding inner surfaces of a peripheral edge portion 46 to each other. In a portion in which part of the electrode terminal is protruded from the outer casing 29, as shown in FIG. 2, the inner surfaces of the laminated films 40 and 41 are heat-welded to both front and back surfaces of each of the positive electrode terminal 27 and the negative electrode terminal 28. That is, in the peripheral edge portion 46 of the outer casing 29, a film welding portion 32 in which the inner surfaces of the laminated films 40 and 41 are welded to each other, and a terminal welding portion 34 in which the laminated films 40 and 41 are welded to both surfaces of each of the positive electrode terminal 27 and the negative electrode terminal 28 are formed. A weld strength of the terminal welding portion 34 is usually lower than a weld strength of the film welding portion 32.

In the laminated power storage device 10 disclosed herein, the laminated films 40 and 41 are stacked and welded together in a reduced-pressure atmosphere by using a vacuum chamber or the like, and are thereby sealed. Under atmospheric pressure, pressure inside the outer casing 29 of the laminated power storage device 10 is higher than pressure at the time of the sealing and is lower than atmospheric pressure.

A description will be given of a manufacturing method of the laminated power storage device 10 described above.

The manufacturing method of the laminated power storage device 10 disclosed herein includes the following steps A to D. Hereinbelow, the individual steps will be described sequentially.

In the step A, the electrode body 20 to which the positive electrode terminal 27 and the negative electrode terminal 28 are connected is prepared. The electrode body 20 can be prepared by, e.g., fabricating the electrode body 20 by a known method.

The electrode body 20 can be fabricated by, e.g., the following method, though the method is not limited thereto. A positive electrode sheet is fabricated by applying positive electrode slurry containing a positive electrode active material, a solid electrolyte material, and a solvent to a portion other than a non-formation portion on a positive electrode current collector foil, and drying the positive electrode slurry. A negative electrode sheet is fabricated by applying negative electrode slurry containing a negative electrode active material, a solid electrolyte material, and a solvent to a portion other than a non-formation portion on a negative electrode current collector foil, and drying the negative electrode slurry. The positive electrode sheets and the negative electrode sheets are stacked with solid electrolyte layers each containing a solid electrolyte material interposed therebetween. The stacking is performed such that the non-formation portion of the positive electrode current collector foil and the non-formation portion of the negative electrode current collector foil are protruded from opposite sides of the electrode multilayer portion 21. Pressing is performed in a stacking direction. The positive electrode current collector foils protruded from the electrode multilayer portion 21 are brought together and are connected to the plate-shaped positive electrode terminal 27 by welding. The negative electrode current collector foils protruded from the electrode multilayer portion 21 are brought together and are connected to the plate-shaped negative electrode terminal 28 by welding.

In the step B, the laminated films 40 and 41 are prepared. As described above, each of the laminated films 40 and 41 has the metal sheet 42, the insulating resin layer 43 which covers the outer surface of the metal sheet 42, and the thermoplastic resin layer 44 which covers the inner surface of the metal sheet 42. The laminated film 40 is designed to have a size which allows the laminated film 40 to cover the electrode multilayer portion 21 of the electrode body 20 and protrude part of the positive electrode terminal 27 connected to the electrode body 20 and part of the negative electrode terminal 28 connected thereto from the laminated film 40. The laminated films 40 and 41 are subjected to embossing corresponding to the shape of the electrode body 20. A depression corresponding to the electrode body 20 is provided from the side of the inner surface to the side of the outer surface of each of the laminated films 40 and 41 by embossing.

Figure 4:
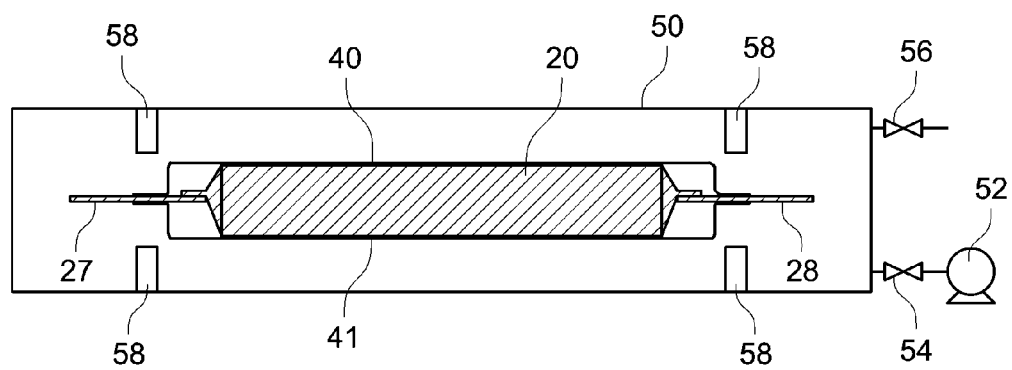
FIG. 4 is a cross-sectional view for explaining a manufacturing method of a laminated battery according to the embodiment.
Figure 5:
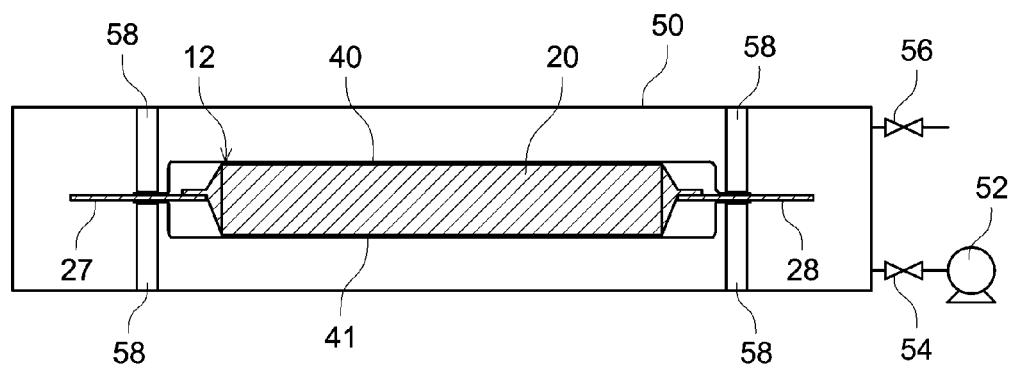
FIG. 5 is a cross-sectional view for explaining the manufacturing method of the laminated battery according to the embodiment.
Figure 6:
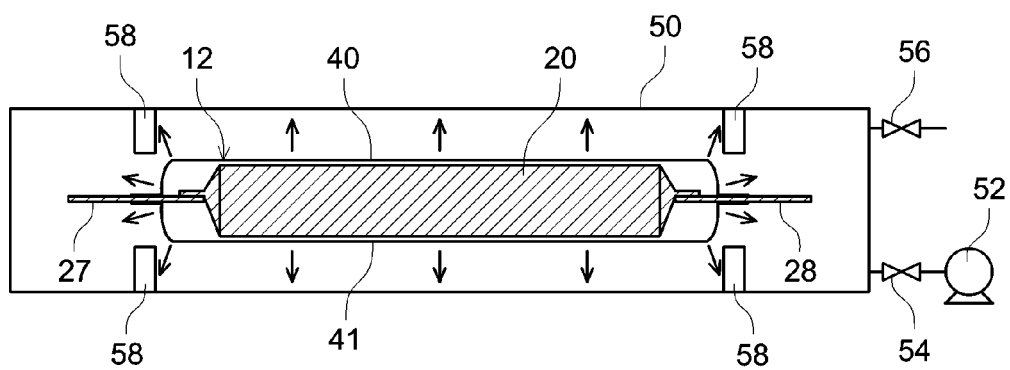
FIG. 6 is a cross-sectional view for explaining the manufacturing method of the laminated battery according to the embodiment.
Figure 7:
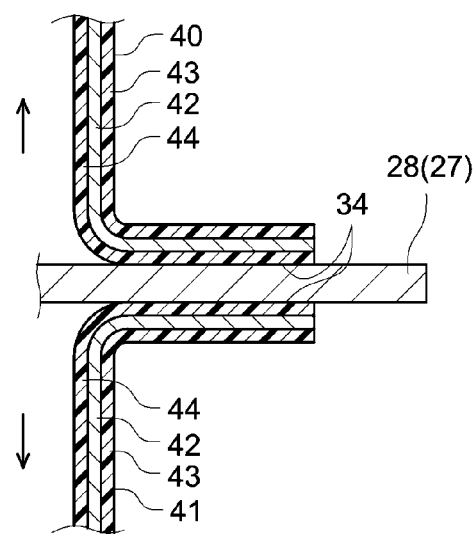
FIG. 7 is a cross-sectional view for explaining the manufacturing method of the laminated battery according to the embodiment.

FIGS. 4 to 7 are cross-sectional views for schematically explaining the manufacturing method of the laminated power storage device 10 according to the embodiment of the present disclosure. Each of FIG. 4 and FIG. 5 shows the state of the step C. Each of FIG. 6 and FIG. 7 shows the state of the step D. FIG. 7 schematically shows the state in which a load is applied to the terminal welding portion 34 in the step D. Each arrow in the drawing indicates the direction of the load applied to each of the laminated films 40 and 41 by expansion of air inside the laminated films 40 and 41.

In the present embodiment, the step C and the step D are performed in a vacuum chamber 50. A vacuum pump 52 is connected to the vacuum chamber 50. A vacuum valve 54 is provided between the vacuum chamber 50 and the vacuum pump 52. An atmospheric relief valve 56 for releasing internal air into the atmosphere is provided in the vacuum chamber 50. A welding apparatus is provided in the vacuum chamber 50. Though a detailed description is omitted, the welding apparatus includes a pair of pressure plates 58. Each pressure plate 58 is a rectangular plate-shaped member. The pressure plates 58 are disposed such that an upper surface of the lower pressure plate 58 and a bottom surface of the upper pressure plate 58 face each other. The welding apparatus is not particularly limited as long as the welding apparatus can apply uniform and sufficient heat and pressure to the laminated film 40 via the pressure plate 58, and it is possible to adopt a conventionally known structure without particular limitation.

In the step C, a power storage device assembly 12 which is covered with the laminated films 40 and 41 and is sealed is built.

First, the laminated film 41 is disposed on a fixed base (not shown) in the vacuum chamber 50 with the inner surface of the laminated film 41 facing upward. Next, the electrode body 20 is disposed on the laminated film 41 such that the electrode multilayer portion 21 of the electrode body 20 is positioned within the surface of the disposed laminated film 41. At this point, part of the positive electrode terminal 27 of the electrode body 20 and part of the negative electrode terminal 28 thereof are disposed so as to be protruded from the surface of the disposed laminated film 41 when viewed in a plan view. Subsequently, the laminated film 40 is disposed such that the part of the positive electrode terminal 27 and the part of the negative electrode terminal 28 are protruded to the outside from between the laminated films 40 and 41 around the electrode body 20.

The power storage device assembly 12 is built by sealing the laminated films 40 and 41 by welding.

First, the pressure plate 58 of the welding apparatus is heated to a predetermined temperature. The temperature of the pressure plate 58 at this point is preferably set in consideration of welding temperatures of the insulating resin layer 43 and the thermoplastic resin layer of the laminated film and the thermal conductivity of the pressure plate 58. For example, the temperature of the pressure plate 58 can be set such that the peripheral edge portion 46 of the laminated films 40 and 41 can be heated in a range of 150° C. to 250° C.

As shown in FIG. 5, a portion in which the laminated films 40 and 41 are stacked is held between the pressure plates 58 which are sufficiently heated, and is pressurized. With this, a welding portion 30 in which the laminated films 40 and 41 are stacked and welded together in a state in which part of the electrode terminal is protruded to the outside from between the laminated films 40 and 41 is formed. The welding portion 30 includes the terminal welding portion 34 which is a portion in which part of the positive electrode terminal 27 and part of the negative electrode terminal 28 are protruded to the outside from between the laminated films 40 and 41. In addition, the welding portion 30 includes the film welding portion 32 in which the inner surfaces of the laminated films 40 and 41 are welded to each other.

In the step D, the power storage device assembly 12 is placed in a predetermined reduced-pressure atmosphere.

After the laminated films 40 and 41 are sealed and sufficient time required for cooling of the welding portion 30 elapses, the vacuum pump 52 is activated. The vacuum valve 54 is opened and decompression is performed such that a pressure in the vacuum chamber 50 becomes equal to a preset pressure. When the pressure in the vacuum chamber 50 becomes equal to the preset pressure, the vacuum valve 54 is closed.

Herein, the reduced-pressure atmosphere is an atmosphere having a pressure which is set for guaranteeing that the weld strength of the welding portion 30 is not less than a predetermined strength.

The pressure at this point is appropriately set according to the dimensions of the laminated films 40 and 41, the pressure at the time of the sealing, and the load applied to the laminated films 40 and 41, and it is possible to set the pressure to a pressure which is lower than the pressure at the time of the sealing by about 10 to 70 kPa, and preferably a pressure which is lower than the pressure at the time of the sealing by about 30 to 60 kPa. For example, a pressure which can guarantee that the weld strength of the welding portion 30 is not less than the predetermined strength may be set by making the power storage device assembly 12 of the same type by way of trial in advance and performing a test. In addition, a pressure which can guarantee that the weld strength of the welding portion 30 is not less than the predetermined strength may be calculated by computer simulation related to the power storage device assembly 12 of the same type or theoretical calculation related thereto.

When the vacuum chamber 50 is decompressed, air inside the laminated films 40 and 41 expands due to a pressure difference between the inside of the laminated films 40 and 41 and the vacuum chamber 50. When air inside the laminated films 40 and 41 starts to expand, as shown in FIG. 6, a load is applied to the laminated films 40 and 41 in directions which cause the laminated films 40 and 41 to be pulled from the outside. To a surface of the inner surface of each of the laminated films 40 and 41 which is in contact with air inside the laminated films 40 and 41, a load can be applied in a direction perpendicular to the surface.

A load is applied to the welding portion 30 along an inner periphery of the welding portion 30. Specifically, the load by which the laminated film 40 and the laminated film 41 are pulled in mutually opposite directions is applied to the inner periphery of the welding portion 30. As shown in FIG. 7, the load by which the laminated films 40 and 41 welded to the positive electrode terminal 27 and the negative electrode terminal 28 are pulled in mutually opposite directions is applied to the terminal welding portions 34.

Next, by closing the vacuum valve 54, stopping the vacuum pump 52, and opening the atmospheric relief valve 56, air in the vacuum chamber 50 is released into the atmosphere. When air in the vacuum chamber 50 is released into the atmosphere, air inside the laminated films 40 and 41 contracts. It is possible to manufacture the laminated power storage device 10 by performing initial charge on the power storage device assembly 12.

In the case where the weld strength of the welding portion 30 is insufficient, flaking occurs in the welding portion 30. The power storage device assembly 12 in which the flaking has occurred in the welding portion 30 is removed from the manufacturing steps. It is possible to determine whether or not the flaking has occurred in the welding portion 30 from, e.g., states of the laminated films 40 and 41 of the power storage device assembly 12 after air in the vacuum chamber 50 is released into the atmosphere, though the method is not limited thereto. In the case where the weld strength is insufficient and the flaking has occurred in the welding portion 30, the inside of the laminated films 40 and 41 communicates with the outside. Consequently, air enters space between the laminated films 40 and 41 and the electrode body 20, and bulges can be partially formed in the laminated films 40 and 41. In the case where the weld strength is sufficient and the flaking is not present in the welding portion 30, the inside of the laminated films 40 and 41 does not communicate with the outside. Consequently, such bulges are less likely to be formed. In addition, in the case where the sealing of the laminated films 40 and 41 is performed in the reduced-pressure atmosphere, the pressure inside the laminated films 40 and 41 can be lower than atmospheric pressure. At this point, a difference between the pressure inside the laminated films 40 and 41 and atmospheric pressure occurs, and the laminated films 40 and 41 are in intimate contact with the electrode body 20 due to the pressure difference.

The laminated power storage device 10 manufactured by this manufacturing method is placed in an atmosphere having a pressure which is reduced to be lower than the pressure at the time of the sealing. At this point, a load is applied to the welding portion 30 in which the laminated films 40 and 41 are welded together in a direction which tears the laminated films 40 and 41 from each other. Consequently, the laminated power storage device 10 in which the weld strength of the welding portion 30 is determined to be sufficient is manufactured. In addition, in the case where the weld strength is insufficient and airtightness of the welding portion 30 is not maintained, when the power storage device assembly 12 is placed in the reduced-pressure atmosphere in the step D, the laminated films 40 and 41 do not expand properly. Accordingly, it is possible to visually determine that the weld strength is insufficient.

Inspection of the weld strength of the laminated film is performed by, e.g., destructive inspection such as a peel test. However, such inspection needs to be performed by a sampling inspection during manufacturing or after manufacturing, and it is not possible to guarantee the weld strengths of all of the manufactured laminated power storage devices. The laminated power storage device 10 manufactured by the manufacturing steps disclosed herein is manufactured via the step in which the laminated power storage device 10 is placed in the above-described reduced-pressure atmosphere, whereby it is determined that the weld strength of the welding portion 30 is sufficient by the inspection. That is, according to the present manufacturing method, it is possible to perform 100% inspection of the weld strength of the laminated film. In addition, it is not necessary to pick a sample and perform destructive inspection, and hence material is less likely to be wasted.

The reduced-pressure atmosphere in the step D may also be an atmosphere having a pressure which is set for guaranteeing that the weld strength of a portion of the welding portion 30 in which part of the electrode terminal is protruded to the outside from between the laminated films 40 and 41, i.e., the terminal welding portion 34 is not less than a predetermined strength.

In the film welding portion 32, the thermoplastic resin layers 44 of the inner surfaces of the laminated films 40 and 41 are welded to each other. In the terminal welding portion 34, the thermoplastic resin layers 44 are welded to both surfaces of each of the positive electrode terminal 27 and the negative electrode terminal 28. The weld strength of the above terminal welding portion 34 tends to be lower than that of the film welding portion 32. In addition, when vibrations occur in the laminated power storage device 10, the positive electrode terminal 27 and the negative electrode terminal 28 vibrate in response to vibrations of connected components. A load caused by such vibrations tends to be applied to the terminal welding portion 34. From such a viewpoint, the pressure of the reduced-pressure atmosphere in the step D may be set by using the weld strength required of the terminal welding portion 34 as a reference. With this, it is possible to manufacture the laminated power storage device 10 in which the weld strength is guaranteed particularly in the terminal welding portion 34.

In another embodiment, in the step C, the sealing of the laminated films 40 and 41 is performed in a predetermined first reduced-pressure atmosphere of which the pressure is reduced to be lower than atmospheric pressure. In the step D, the reduced-pressure atmosphere when the sealed laminated films 40 and 41 are placed is a predetermined second reduced-pressure atmosphere of which the pressure is further reduced to be lower than that of the first reduced-pressure atmosphere.

In the step C, the electrode body 20 covered with the laminated films 40 and 41 is accommodated in the vacuum chamber 50, and the vacuum chamber 50 is decompressed until the first reduced-pressure atmosphere is obtained. The pressure of the first reduced-pressure atmosphere is appropriately set to the dimensions of the laminated film 40 and pressure which is required as the internal pressure of the laminated power storage device 10, and can be set to, e.g., about 30 to 90 kPa, and preferably about 50 to 70 kPa.

In the step D, the sealed laminated films 40 and 41 are placed in the second reduced-pressure atmosphere of which the pressure is further reduced to be lower than that of the first reduced-pressure atmosphere. Herein, the pressure reduction from the first reduced-pressure atmosphere to the second reduced-pressure atmosphere can be performed continuously in the vacuum chamber 50.

The pressure of the second reduced-pressure atmosphere is the pressure which is set for guaranteeing that the weld strength of the welding portion 30 is not less than the predetermined strength. The pressure of the second reduced-pressure atmosphere is appropriately set according to the dimensions of the laminated films 40 and 41, the pressure at the time of the sealing, and the load applied to the laminated films 40 and 41. The pressure of the second reduced-pressure atmosphere can be set to, e.g., a pressure which is lower than the pressure of the first reduced-pressure atmosphere by about 10 to 70 kPa, and preferably a pressure which is lower than the pressure of the first reduced-pressure atmosphere by about 30 to 60 kPa.

The laminated power storage device 10 manufactured by this manufacturing method is sealed in the first reduced-pressure atmosphere of which the pressure is reduced to be lower than atmospheric pressure. In the laminated power storage device 10, the outer casing 29 is in intimate contact with the electrode body 20 due to a difference between the pressure inside the outer casing 29 and atmospheric pressure. Consequently, the outer casing 29 is unlikely to deform and a rupture is unlikely to occur.

In another embodiment, in the step C, in the first reduced-pressure atmosphere, the electrode body 20 is covered with the laminated films 40 and 41. Next, also in the first reduced-pressure atmosphere, the sealing of the laminated films 40 and 41 is performed.

According to this manufacturing method, after the electrode body 20 is covered with the laminated films 40 and 41 and the laminated films 40 and 41 are sealed, decompression is performed. That is, when air inside the laminated films 40 and 41 comes out due to the decompression, the laminated films 40 and 41 are unlikely to curl up and the positions of the laminated films 40 and 41 are unlikely to be displaced. Consequently, efficient manufacturing of the laminated power storage device 10 is allowed.

While the step C and the step D are performed in the vacuum chamber 50 in the above-described embodiment, the step C and the step D are not limited to the above mode unless otherwise noted. For example, the vacuum chamber used in the step C may be different from the vacuum chamber used in the Step D. Between the step C and the step D, the power storage device assembly may be taken out and processing such as initial charge may be performed.

In addition, the manufacturing method disclosed herein is not limited to the manufacturing method including only the steps A to D, and can include other steps. For example, the manufacturing method can include the step of a helium leak inspection for inspection for a leak. In general, in the helium leak inspection, when introduction and detection of helium are performed, it is necessary to bring a detection chamber into a decompression state. For example, by causing a reduced-pressure atmosphere when the helium leak inspection is performed and a reduced-pressure atmosphere when the weld strength of the welding portion 30 is guaranteed to match each other, it is possible to perform guaranteeing of the strength and inspection for the leak at the same time.

While the manufacturing method of the laminated power storage device 10 disclosed herein has been described by using the all-solid battery as the example, the present disclosure is not limited thereto. The technique disclosed herein can also be applied to a secondary battery which uses a liquid electrolyte. In this case, a process of injecting the electrolyte can be incorporated in the step of sealing the laminated films 40 and 41.

Incidentally, while the pressure of the second reduced-pressure atmosphere is appropriately determined based on the pressure of the first reduced-pressure atmosphere and various conditions, it is possible to approximately calculate the pressure of the second reduced-pressure atmosphere from the design of the laminated power storage device 10 and step conditions, as described below. An example will be described.

First, the weld strength required of the welding portion 30 of the laminated power storage device 10 is determined. The required weld strength can be determined by, e.g., a test in which an actual use environment is simulated and a load is applied, a test such as a peel test, and simulation. With regard to the test in which the actual use environment is simulated, for example, in the case where the laminated power storage device 10 is a vehicle-mounted laminated power storage device, an experimental device can be mounted on a vehicle and the test can be performed. For example, an experimental laminated power storage device of the same type as the laminated power storage device 10 is prepared. Subsequently, the maximum load applied to the welding portion by vibrations during running of the vehicle is measured, and the required weld strength can be thereby determined.

Next, from a pressure $P_1$ of the first reduced-pressure atmosphere at the time of the sealing in the step C, a pressure $P_2$ of the second reduced-pressure atmosphere, and the dimensions of the laminated films 40 and 41, a load applied to the laminated films 40 and 41 under reduced pressure is calculated.

The pressure $P_1$ of the first reduced-pressure atmosphere is defined in advance by, e.g., required internal pressure of the laminated films 40 and 41 when the laminated power storage device 10 is completed. As the dimensions of the laminated films 40 and 41, an inner periphery length L of the welding portion 30 and a surface area S of wide surfaces formed in the laminated films 40 and 41 by embossing are used. The dimensions of the laminated films 40 and 41 are determined according to the dimensions of the electrode body 20. The dimensions of the electrode body 20 are defined in advance from required performance of the laminated power storage device 10 serving as a power storage device.

When the pressure is reduced form the pressure of the first reduced-pressure atmosphere to the pressure of the second reduced-pressure atmosphere in the vacuum chamber 50, a load $F_1$ is applied to a surface which is in contact with air inside the laminated films 40 and 41 in a direction perpendicular to the surface by a pressure difference. The load $F_1$ is expressed as $$F_1 = (P_1 - P_2) \times S$$

and the pressure $P_2$ of the second reduced-pressure atmosphere is expressed as $$P_2 = P_1 - F_1/S.$$

At this point, a load by which the laminated films 40 and 41 are pulled in mutually opposite directions is applied to the welding portion 30 along the inner periphery of the welding portion 30. At this point, given that a load per unit length $F_2$ is applied, a load obtained by $F_2 \times L$ is applied to the entire inner periphery of the welding portion 30. The load is equal to the above load $F_1$, and hence $$F_2 \times L = F_1$$

is satisfied. The pressure $P_2$ of the second reduced-pressure atmosphere is expressed as $$P_2 = P_1 - F_2 \times L/S. \qquad \text{Formula 1:}$$

By substituting the weld strength required of the welding portion 30 for $F_2$, it is possible to determine the pressure $P_2$ of the second reduced-pressure atmosphere for determining whether or not the welding portion 30 has the weld strength.

A specific example in which the pressure of the second reduced-pressure atmosphere is set according to the above calculation is shown below.

It is assumed that the length of the wide surface formed in each of the laminated films 40 and 41 is 250 mm, the width thereof is 80 mm, and it will be guaranteed that the weld strength of the welding portion 30 is not less than 15 N/cm. The surface area S of the wide surfaces and the inner periphery length L of the welding portion 30 are given by $$S = 250 \text{ mm} \times 80 \text{ mm} \times 2 = 0.04 \text{ m}^2 \text{ and}$$

$$L = (250 \text{ mm} + 80 \text{ mm}) \times 2 = 66 \text{ cm}.$$

In the case where the pressure $P_1$ of the first reduced-pressure atmosphere at the time of the sealing is 60 kPa, $$P_2 = P_1 - F_2 \times L/S = 60 \text{ kPa} - (15 \text{ N/cm}) \times 66 \text{ cm}/0.04 \text{ m}^2 = 60 \text{ kPa} - 24.75 \text{ kPa} = 35.25 \text{ kPa}$$

is satisfied. The pressure of the second reduced-pressure atmosphere is preferably set to a pressure which is lower the pressure of the first reduced-pressure atmosphere by 24.75 kPa or more, i.e., a pressure of not more than 35.25 kPa.

Herein, for the sake of simplicity, it is assumed that the length and the width provided in the embossing of the laminated films 40 and 41 are sufficiently long and wide with respect to the thickness thereof, and a pressure applied to a side surface is neglected. In addition, deformation and volume change caused by the expansion of the laminated films 40 and 41 when the pressure is reduced from the pressure of the first reduced-pressure atmosphere to the pressure of the second reduced-pressure atmosphere are neglected. There are cases where such approximation cannot be performed due to an increase in the deformation of the laminated films 40 and 41 and the like. In such cases, by using, e.g., simulation to calculate the load applied to the welding portion 30 under reduced pressure, it is possible to determine whether or not the welding portion 30 has the required weld strength with higher accuracy.

The present inventors wish to propose a method of inspecting the weld strength of the welding portion 30 of the laminated power storage device 10 after manufacturing to determine whether or not the weld strength thereof is sufficient by using the above-described technique.

The inspection method of the laminated power storage device disclosed herein includes a step of preparing the laminated power storage device 10 and a step of placing the prepared laminated power storage device 10 in a reduced-pressure atmosphere. Specifically, it is possible to perform the inspection of the weld strength by preparing the laminated power storage device 10, accommodating the laminated power storage device 10 in the vacuum chamber, and decompressing the vacuum chamber. The laminated power storage device 10 which is inspected herein does not need to be an unused laminated power storage device. For example, the present inspection method may be adopted as a method of inspecting the weld strength of the laminated power storage device before being reused.

The laminated power storage device 10 includes the electrode body 20 to which the electrode terminal is connected, and the outer casing 29 constituted by the laminated films 40 and 41. The electrode terminal is plate-shaped. The welding portion 30 in which the laminated films 40 and 41 are stacked and welded together in the state in which part of the electrode terminal is protruded to the outside from between the laminated films 40 and 41 is formed around the electrode body 20. The welding portion 30 includes the terminal welding portion 34 which is the portion in which part of the electrode terminal is protruded to the outside from between the laminated films 40 and 41. In addition, the welding portion 30 includes the film welding portion 32 in which the inner surfaces of the laminated films 40 and 41 are welded to each other.

The reduced-pressure atmosphere is the atmosphere having the pressure which is set for guaranteeing that the weld strength of the welding portion 30 is not less than the predetermined strength. Herein, the pressure of the reduced-pressure atmosphere is set to a pressure lower than the pressure inside the outer casing 29 of the laminated power storage device 10.

It is possible to determine the pressure for guaranteeing the weld strength by a method in which the laminated power storage device of the same type is made by way of trial in advance and the test is performed, or a method in which computer simulation is performed. In addition, for example, it is possible to determine the pressure therefor by theoretical calculation based on Formula 1 described above. Hereinbelow, as an example, a description will be given of a method of determining the pressure for guaranteeing the weld strength based on Formula 1 described above.

In Formula 1, the pressure for guaranteeing the weld strength corresponds to $P_2$.

$$P_2 = P_1 - F_2 \times L/S \qquad \text{Formula 1:}$$

It is possible to determine the weld strength $F_2$ required of the welding portion 30 by the test and the simulation, as described above. The inner periphery length L of the welding portion 30, the surface area S of the wide surfaces of the outer casing 29, and the pressure $P_1$ inside the outer casing 29 are defined in advance from the required performance of the laminated power storage device 10 serving as the power storage device.

As described above, herein, the pressure applied to the side surface of the outer casing 29 and the deformation at the time of expansion are neglected, and calculation is performed. In the case where the deformation at the time of the expansion of the outer casing 29 is increased, it is possible to determine whether or not the welding portion 30 has the required weld strength by inspection with higher accuracy by using, e.g., the simulation or the like to calculate the load applied to the welding portion 30 under reduced pressure.

The laminated power storage device 10 is disposed in the vacuum chamber. In the case where the pressure inside the outer casing 29 is lower than atmospheric pressure, the outer casing 29 is in intimate contact with the electrode body 20 due to the pressure difference.

As decompression is started and the pressure in the vacuum chamber is reduced, a difference between the pressure in the vacuum chamber and the pressure inside the outer casing 29 is diminished. When the pressure in the vacuum chamber becomes lower than the pressure inside the outer casing 29, expansion of the outer casing 29 starts. During the expansion of the outer casing 29, the pressure inside the outer casing 29 is equal to the pressure in the vacuum chamber. When the decompression further progresses and the outer casing 29 is no longer able to expand, a rise in the pressure inside the outer casing 29 starts.

When the rise in the pressure inside the outer casing 29 starts, a load by which the outer casing 29 is pulled in mutually opposite directions starts to be applied to the welding portion 30. In the case where flaking does not occur in the welding portion 30 when the atmosphere having the set pressure is obtained, it is possible to determine that the weld strength of the welding portion 30 is sufficient by evaluation.

In the case where the pressure $P_1$ inside the outer casing 29 is unknown, it is possible to perform inspection by estimating the pressure when the expansion of the outer casing 29 has started at $P_1$.

According to this inspection method, for the laminated power storage device 10 having the sufficient weld strength, it is possible to guarantee the weld strength nondestructively.

In addition, if the capacity of the vacuum chamber permits, it is also possible to inspect a plurality of the laminated power storage devices 10 simultaneously.

The pressure for guaranteeing the weld strength may also be a pressure set for inspecting, among the weld strengths of the welding portion 30, the weld strength of the portion in which part of the electrode terminal is protruded to the outside from between the laminated films 40 and 41, i.e., the terminal welding portion 34 to determine whether or not the weld strength thereof is not less than the predetermined strength.

As described above, the weld strength of the terminal welding portion 34 is usually lower than that of the film welding portion 32. In addition, in the case where vibrations have occurred in the laminated power storage device 10, a load is more likely to be applied to the terminal welding portion 34 than the film welding portion 32. Accordingly, it is possible to determine the required weld strength by using the weld strength of the terminal welding portion 34 as a reference and set the pressure based on the determined weld strength.

While the specific examples of the present disclosure have been described in detail thus far, the specific examples are only illustrative, and are not intended to limit the scope of claims. The disclosure disclosed herein encompasses various modifications and changes to the specific examples described above.

What is claimed is:

1. An inspection method of a laminated power storage device comprising the steps of:
   preparing a laminated power storage device; and
   placing the laminated power storage device in a predetermined reduced-pressure atmosphere, wherein
   the laminated power storage device includes an electrode body to which an electrode terminal is connected and an outer casing constituted by a laminated film,
   the laminated power storage device has a welding portion in which the laminated films are stacked and welded together in a state in which part of the electrode terminal is protruded to the outside from between the laminated films around the electrode body, and
   a pressure of the predetermined reduced-pressure atmosphere is set so as to determine whether a weld strength of the welding portion is not less than a predetermined strength, and the pressure of the predetermined reduced-pressure atmosphere is lower than a pressure inside the outer casing of the laminated power storage device.

2. The inspection method of a laminated power storage device according to claim 1, wherein
   the electrode terminal is plate-shaped, and
   the predetermined reduced-pressure atmosphere is an atmosphere having a pressure which is set for determining whether a weld strength of a portion of the welding portion in which the part of the electrode terminal is protruded to the outside from between the laminated films is not less than a predetermined strength.

3. The inspection method of a laminated power storage device according to claim 1, further comprising:
   applying a load to the welding portion, wherein applying the load comprises expanding the outer casing during the placing the laminated power storage device in the predetermined reduced-pressure atmosphere.

4. The inspection method of a laminated power storage device according to claim 1, further comprising:

evaluating the weld strength, wherein evaluating the weld strength comprises determining whether the weld strength of the welding portion is sufficient in a case where flaking does not occur in the welding portion in response to placing the laminated power storage device in the predetermined reduced-pressure atmosphere.

5. The inspection method of a laminated power storage device according to claim 1, wherein the pressure of the predetermined reduced-pressure atmosphere is set based on:
   dimensions of the laminated power storage device,
   a pressure inside the outer casing at a time of the sealing, and
   a load applied to the laminated films.

\* \* \* \* \*